United States Patent [19]

Koster et al.

[11] Patent Number: 4,830,743

[45] Date of Patent: May 16, 1989

[54] WATER TREATMENT APPARATUS

[75] Inventors: Peter B. Koster, Tunbridge Wells; Ian A. Crossley, East Sussex, both of Great Britain

[73] Assignee: Portacel Limited, Kent, Great Britain

[21] Appl. No.: 44,809

[22] Filed: Apr. 30, 1987

[30] Foreign Application Priority Data

May 2, 1986 [GB] United Kingdom ................ 8610772

[51] Int. Cl.[4] ...................... B01D 21/30; G05D 16/00
[52] U.S. Cl. .................... 210/96.1; 210/137; 210/143; 210/192; 422/112; 422/119; 422/305; 137/893
[58] Field of Search ............. 210/739, 741, 254, 96.1, 210/143, 199, 137, 192; 422/112, 113, 119, 305; 137/893

[56] References Cited

U.S. PATENT DOCUMENTS

| | | | |
|---|---|---|---|
| 1,285,492 | 11/1918 | Wallace et al. | 210/754 |
| 1,483,256 | 2/1924 | Van Meter | 210/754 |
| 1,777,987 | 10/1930 | Wallace | 210/754 |
| 4,250,144 | 2/1981 | Ratigan | 210/754 |
| 4,333,833 | 6/1982 | Longley et al. | 210/754 |

FOREIGN PATENT DOCUMENTS 255859  3/1970  U.S.S.R. ............. 210/754

Primary Examiner—Benoit Castel
Attorney, Agent, or Firm—Rosen, Dainow & Jacobs

[57] ABSTRACT

Apparatus for the treatment of water supplies with the gas of the type comprising, in sequence, the following elements: (a) a vacuum regulator 2 for providing a low pressure supply of the gas from a high pressure source; (b) a monitor system 3 to signal unwanted pressure changes; (c) a gas flow meter 4; (d) an output flow control valve 5 coupled with a vacuum relief valve 6 to ensure the gas pressure stays above a required level; (e) a differential control valve 8 serving to maintain a constant pressure differential between the output flow control valve and the mixing device, (f) a gas and water mixing device 9, is improved by arranging that at least two successive elements (a) to (f) are directly abutted for gas flow through aligned openings. Abutted elements are conveniently housed in monolithic blocks.

10 Claims, 2 Drawing Sheets

WATER TREATMENT APPARATUS

BACKGROUND OF THE INVENTION

This invention relates to apparatus for the treatment of water supplies with a gas for sterilization, pH control etc.

Water supplies must normally be treated before they are safe or suitable for consumption. One major type of treatment involves the chlorination of water to sterilize it. In this process a supply of gaseous chlorine is brought into contact with the water supply in a special apparatus, normally referred to in the water treatment art as a chlorinator. The same, or similar apparatus can also be used for treatment of water with sulphur dioxide or ammonia. For pH control the same or similar apparatus can be used to treat the water with carbon dioxide.

Apparatus of this type is required to carry out a number of operations in the treatment process. The supply of gas will usually be from a high pressure source, for example pressurized cylinders of chlorine gas. The actual mixing of the gas with the water is carried out at sub-atmospheric pressure in a venturitype device, normally referred to as an ejector, in which the flow of water from a jet creates a low-pressure zone into which gas is introduced. It is therefore necessary for the high pressure source of gas to be converted into a low pressure supply. Thus apparatus of this type includes a control system normally referred to as a vacuum regulator in which the high pressure gas is allowed to expand with a corresponding pressure drop before being passed to the next part of the apparatus. The vacuum regulator is generally provided with venting means to allow a surge of pressure to be released by venting the gas to the atmosphere.

Conventionally, the vacuum regulator passes the gas to a monitoring system designed to provide a warning if the pressure is incorrect (either too high or too low). From here the gas passes to a flow measuring device, conventionally a floating cone flowmeter giving a visual indication of the rate of flow of gas.

The gas next passes to a control valve serving to control the output of gas to the ejector. This valve is conventionally a linear response valve of the type where the flow is directly proportional to the displacement of a control knob or wheel. This control valve may be manually operated or may be to a greater or lesser extent automated. The control valve is normally fitted with a vacuum override relief valve serving to allow the intake of atmospheric air if the pressure drops too far.

From the control valve the gas passes to the ejector where it is mixed with the water. An optional refinement in the system is the incorporation of a differential control valve which is responsive to changes in the pressure difference between the control valve and the ejector (for example caused by fluctuations in the water supply pressure). A differential control valve of this type generally includes a diaphragm valve which adjusts the pressure in the gas flow in response to changes in pressure in the ejector.

Apparatus of this type is well known and has been in use for very many years with considerable success. However, the main problem which is encountered in this type of apparatus results from the need to use corrosive gases such as chlorine and sulphur dioxide. All pipework interconnecting the various elements in the apparatus has to withstand the gas with each joint secure against leakage.

SUMMARY OF THE INVENTION

In accordance with the present invention there has now been devised an improvement in apparatus of this type, in which the problems of gas corrosion and leakage are minimised.

According to the present invention there is provided apparatus for the treatment of water supplies with a gas and comprising, in sequence, the following elements:

(a) a vacuum regulator for providing a low pressure supply of the gas from a high pressure source, and optionally a high pressure relief valve and a high vacuum valve, to ensure the gas pressure remains within pre-set limits, (b) an optional monitor system to signal unwanted pressure changes, (c) a gas flow meter, (d) an output flow control valve coupled with a vacuum relief valve to ensure the gas pressure stays above a required level, (e) an optional differential control valve serving to maintain a constant pressure differential between the output flow control valve and the mixing device, and (f) a gas and water mixing device.

characterised in that at least two successive elements (a) to (f) are directly abutted for gas flow through aligned openings.

Direct abutment of the elements can be achieved by housing each element (with the exception of element c)) in monolithic blocks in which are moulded and/or machined the necessary apertures and cavitites. The blocks are designed so that the respective output and input apertures can be aligned when the blocks are abutted, conveniently in the form of a vertical stack. Other configurations are, however, possible. A suitable gas-tight seal can be provided between two such blocks and their aligned apertures by the provision of hollow, e.g tubular, inserts arranged for a tight plug fit in each aperture. Such a tight fit can conveniently be provided by provision of O-ring seals on the outer surface of the hollow insert. Other sealing methods involving specialized gasket constructions are also possible.

The monolithic blocks are conveniently formed from solid plastics material such as unplasticized polyvinyl chloride (uPVC) especially or acrylonitrile-butadiene-styrene copolymer (ABS), or a fluorocarbon such as polyvinylidene fluoride (PVDF). Other suitable materials include glass and ceramic materials. Plastics materials are preferred on account of their corrosion-resistance, ease of machining and resilience.

Element (c), the gas flow meter, was excluded from inclusion in a monolithic block, for the obvious reason that the position of the floating cone has to remain visible. However, it is feasible that such a flow meter could be encapsulated in a clear resin block or alternatively mounted in a block with a suitable viewing aperture.

BRIEF DESCRIPTION OF THE DRAWINGS

Three specific embodiments of the present invention will now be described by way of example and with reference to the accompanying drawings, in which.

DESCRIPTION OF THE PREFERRED EMBODIMENTS

Figure 1:
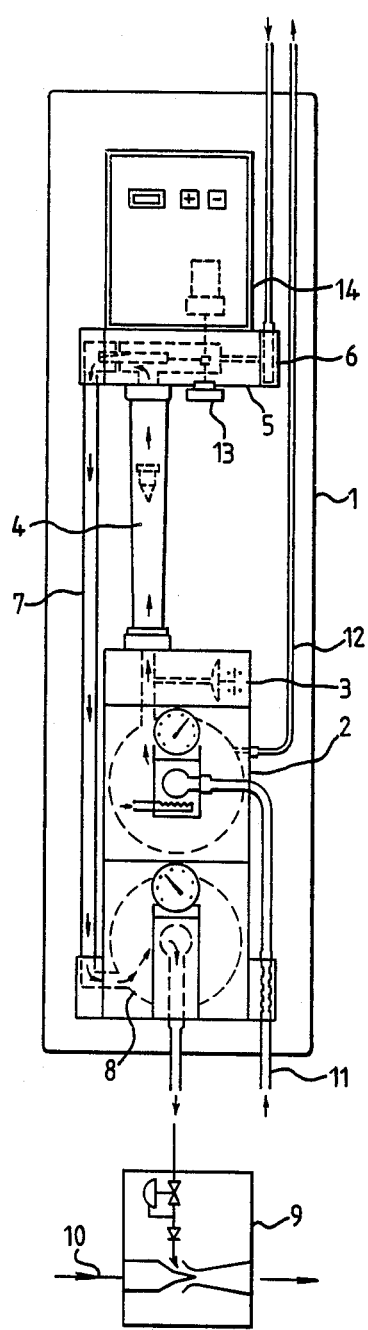
FIG. 1 represents a front elevation of the gas control part of a water treatment apparatus, with the ejector shown diagrammatically below.

Referring particularly to FIG. 1, the water treatment apparatus comprises a number of interlinked elements mounted on a common mounting board 1 in a vertical stack. A vacuum regulator 2 mounted in a monolithic block of plastics material having formed therein suitable apertures for a gas inlet pipe 11 and a gas vent line 12 for venting excess gas to the atmosphere.

Mounted immediately on top of the vacuum regulator 2 is monitor system 3 arranged to provide a signal if the gas pressure varies beyond predetermined limits (both upwards and downwards). The monitor system 3 is fitted in a second monolithic plastics block having an inlet arranged to align with the outlet from the vacuum regulator 2. The joint between the two blocks is sealed by means of a tubular insert 31 (see FIG. 3) arranged for plug fit to bridge the apertures in the vacuum regulator 2 and the monitor system 3. Each end of the tubular insert 31 is provided with an annular recess 32 housing an O-ring 33. The tubular insert 31 can be formed of any suitable material, such as a hard plastics material, e.g. uPVC or Polytetrafluoroethylene (PTFE).

Figure 3:
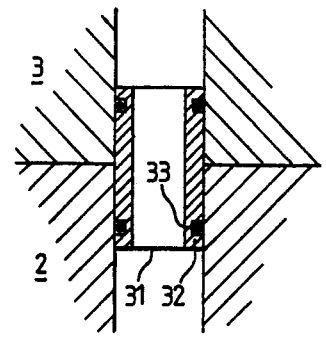
FIG. 3 represents a sectional detail of a seal linking two aligned apertures.

Immediately above the monitor system 3 is fitted a flow meter 4 arranged to abut between the monitor system 3 and an output flow control valve 45. The flow meter 4 is a conventional taper-tube floating cone meter. The control valve 5 is also housed within a monolithic plastics block formed having an inlet aperture arranged to align with the outlet aperture of the monitor system 3 so as to house the flow meter tube 4 in between. Seals similar to that shown in FIG. 3 are used for gas-tight fit. Alternatively, collars with O-ring seals can be used on the flow meter tube. The control valve 5 is coupled to a vacuum relief valve 6 arranged to allow intake of atmospheric air if the pressure drops below a predetermined level. The valve 5 is of the linear response variable area type wherein the cross-sectional area of the permitted gas flow is directly proportional to displacement of a control knob or wheel 13. In the embodiment shown in FIG. 1 the apparatus is provided with the option of an automatic controller of alternatively a motorized control 14, whereby the gas flow from the control valve 5 can be varied by signals from a remote source (either provided by the operator, or through automatic feedback from suitably placed sensing means). In preferred embodiments, the vacuum regulator 2 is coupled with a high vacuum relief valve. When the vacuum rises above the required working level (i.e. the pressure falls) the high vacuum valve closes, allowing the vacuum to build up to a level at which the vacuum relief valve 6 opens to admit air. The flow through the relief valve 6 is determined by the discharge across a central orifice and is controlled by the spring load setting (differential) of the valve itself. In effect, the relief valve 6 acts as a second vacuum regulator drawing in air. The advantages of such a system are that the gas container is not subjected to a high vacuum; there is no influx of dirt and especially no influx of moisture, when the gas container is disconnected and the ejector is left running, and also the pressure in the system from the regulator 2 to the control orifice in the control valve 5 is kept to a minimum, thereby reducing the chances of water flood-back. In a preferred embodiment, the high vacuum valve shuts at about 7473 Pa (30" wg) and the vacuum relief valve 6 opens at 17,436 Pa (70" wg).

Figure 2:
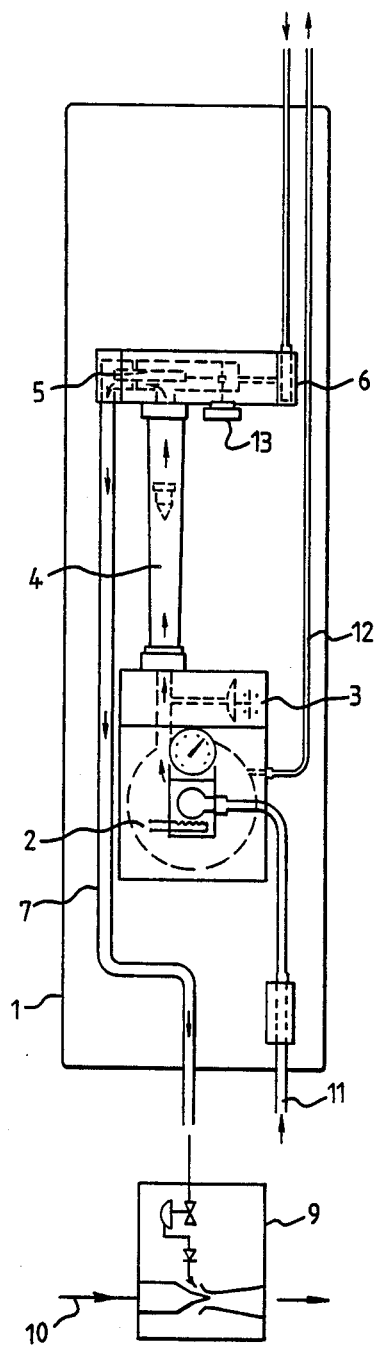
FIG. 2 represents a similar apparatus without automatic control and without the differential control valve.

From the control valve 5 the gas passes along a tubular duct 7 formed from plastics material and into a differential control valve 8. In an alternative embodiment (not shown) the differential control valve 8 can be mounted immediately abutting the control valve 5. Like the vacuum regulator 2 and the control valve 5, the differential control valve 8 is also housed within a monolithic block of plastics material formed for close abutment to the other components. The differential control valve 8 comprises a diaphragm-based system whereby pressure changes in the ejector 9 serve to control the difference in pressure between the control valve 5 and the ejector 9. As shown in FIG. 2, the differential control valve 8 can be omitted in simple manual-controlled systems.

Figure 4:
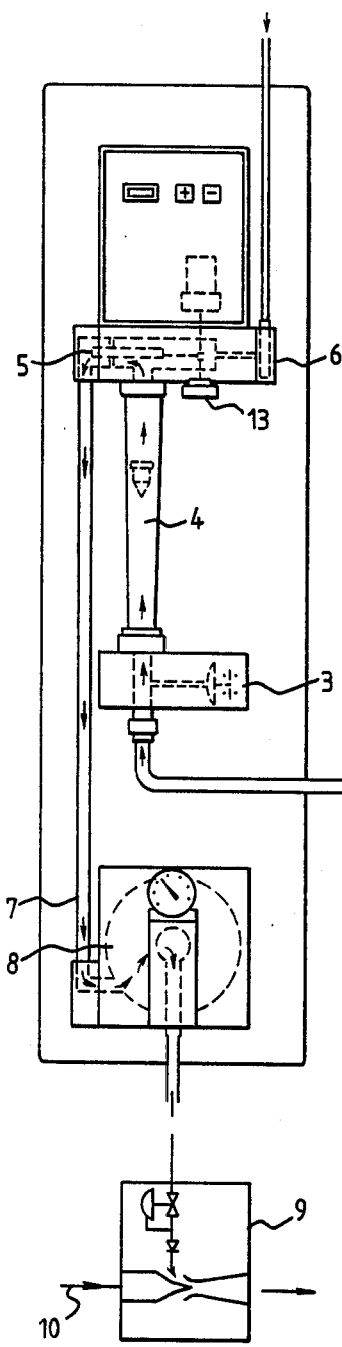
FIG. 4 represents a modification of the apparatus of FIG. 1 in which the vacuum regulator is remotely positioned.
Figure 4:
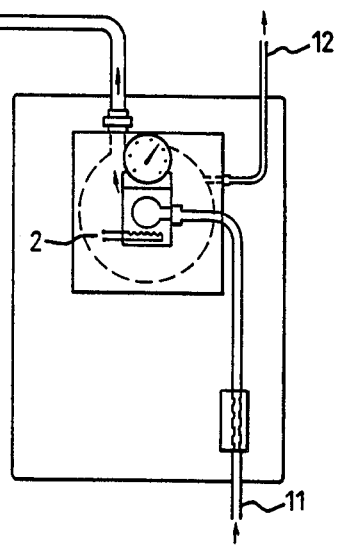

As shown in FIG. 4, the apparatus of FIG. 1 can be modified by having the vacuum regulator 2 located apart from the remainder of the apparatus. Such a system has advantages where the high pressure gas source is necessarily located at some distance from the water treatment apparatus. By having the vacuum regulator 2 closer to the high pressure gas source, the connecting pipe work 15 is on the low pressure side of the vacuum regulator 2, rather than the high pressure side. This is clearly a safer arrangement.

We claim:

1. In an apparatus for the treatment of water with gas, the apparatus including, in sequence, the following elements coupled together:
   (a) a vacuum regulator for providing a low pressure supply of the gas from a high pressure source,
   (b) a gas flow meter,
   (c) an output flow control valve and a vacuum relief valve coupled thereto to ensure that the gas pressure stays above a required level, and
   (d) a gas and water mixing device;
the improvement comprising a direct abutment of at least two successive of said elements each of which is housed in a monolithic block, said monolithic blocks having aligned orifices for gas flow therethrough.

2. Apparatus according to claim 1 comprising a tubular insert inserted in said aligned orifices for sealing them.

3. Apparatus as claimed in claim 1 or 2 comprising a direct abutment of at least three successive of said elements.

4. In an apparatus for the treatment of water with a gas, the apparatus comprising, in sequence, the following elements coupled together:
   (a) a vacuum regulator for providing a low pressure supply of the gas from a high pressure source,
   (b) a monitor system to signal unwanted pressure changes,
   (c) a gas flow meter,
   (d) an output flow control valve and a vacuum relief valve coupled thereto to ensure that the gas pressure stays above a required level, and
   (e) a gas and water mixing device;
the improvement comprising a direct abutment of at least two successive of said elements each of which is housed in a monolithic block, said monolithic blocks having aligned orifices for gas flow therethrough.

5. Apparatus according to claim 4 comprising a tubular insert inserted in said aligned orifices for sealing them.

6. Apparatus as claimed in claim 4 or 5 comprising a direct abutment of at least three successive of said elements.

7. In an apparaus for the treatment of water with a gas, the apparatus comprising, in sequence, the following elements coupled together:
(a) a vacuum regulator for providing a low pressure supply of the gas from a high pressure source,
(b) a monitor system to signal unwanted pressure changes,
(c) a gas flow meter,
(d) an output flow control valve and a vacuum relief valve coupled thereto to ensure that the gas pressure stays above a required level,
(e) a differential control valve for maintaining a constant pressure differential between the output flow control valve and a gas and water mixing device, and
(f) the gas and water mixing device, the improvement comprising a direct abutment of at least two successive of said elements each of which is housed in a monolithic block, said monolithic blocks having aligned orifices for gas flow therethrough.

8. Apparatus according to claim 7 comprising a tubular insert inserted in said aligned orifices for sealing them.

9. Apparatus as claimed in claim 7 or 8 comprising a direct abutment of at least three successive of said elements.

10. Apparatus according to claim 1, 4 or 7 comprising a high pressure relief valve and a high vacuum valve coupled to said vacuum regulator for maintaining the gas pressure of the gas provided by said vacuum regulator within pre-set limits.

* * * * *